(12) United States Patent
Raghuram et al.

(10) Patent No.: US 6,961,569 B2
(45) Date of Patent: Nov. 1, 2005

(54) METHOD FOR A RADIOTELEPHONE TO SCAN FOR HIGHER PRIORITY PUBLIC LAND MOBILE NETWORK

(75) Inventors: Sharada Raghuram, Buffalo Grove, IL (US); Richard C. Burbidge, Hook (GB); Donald A. Dorsey, Vernon Hills, IL (US)

(73) Assignee: Motorola Inc, Schaumburg, IL (US)

( * ) Notice: Subject to any disclaimer, the term of this patent is extended or adjusted under 35 U.S.C. 154(b) by 164 days.

(21) Appl. No.: 10/431,025

(22) Filed: May 7, 2003

(65) Prior Publication Data

US 2004/0224689 A1    Nov. 11, 2004

(51) Int. Cl.$^7$ ............................................. H04Q 7/20
(52) U.S. Cl. ............................ 455/435.1; 455/432.1; 455/421; 455/422.1; 455/414
(58) Field of Search ..................... 455/435.1, 435.2, 455/435.3, 432.2, 432.3, 407, 408, 432.1, 455/414.1, 414.2, 414.3, 421, 422.1

(56) References Cited

U.S. PATENT DOCUMENTS

| | | | |
|---|---|---|---|
| 5,790,952 A * | 8/1998 | Seazholtz et al. | 455/432.1 |
| 5,915,214 A * | 6/1999 | Reece et al. | 455/406 |
| 5,950,130 A * | 9/1999 | Coursey | 455/432.1 |
| 6,334,052 B1 * | 12/2001 | Nordstrand | 455/411 |
| 6,631,261 B1 * | 10/2003 | Farber | 455/432.1 |
| 2004/0192304 A1 * | 9/2004 | Casaccia et al. | 455/435.1 |

OTHER PUBLICATIONS

"3$^{rd}$ Generation Partnership Project; Technical Specification Group Radio Access Network; Radio Resource Control (RRC); Protocol Specification " 3GPP TS 25.331; v3.12.0; Sep. 2002.

"3$^{rd}$ Generation Partnership Project; Technical Specification Group Core Network; NAS Functions related to Mobile Station (MS) in idle mode" 3GPP TS 23.122; v5.2.0; Dec. 2002.

* cited by examiner

Primary Examiner—Nay Maung
Assistant Examiner—Shaima Q. Aminzay
(74) Attorney, Agent, or Firm—Sylvia Chen; Brian M. Mancini

(57) ABSTRACT

A method for a radiotelephone to scan for a higher priority (including home) public land mobile network (PLMN) without searching in all possible RATs and frequencies includes a first step of establishing an inclusive list of all frequencies in all radio access technologies (RATs) in use by the higher priority or home public land mobile network. A next step includes camping the radiotelephone on the higher priority or home PLMN. A next step includes obtaining the inclusive list from the establishing step by the camped radiotelephone from the higher priority or home PLMN. Afterwards, when the radiotelephone roams to a lower priority visited PLMN, it can begin scanning for the home (and higher priority) PLMN using only those frequencies from the inclusive list, thereby saving battery power.

18 Claims, 1 Drawing Sheet

METHOD FOR A RADIOTELEPHONE TO SCAN FOR HIGHER PRIORITY PUBLIC LAND MOBILE NETWORK

FIELD OF THE INVENTION

The present invention relates in general to radiotelephone communication systems, and more particularly to a method for a radiotelephone to scan for a higher priority public land mobile network.

BACKGROUND OF THE INVENTION

As various different types of communication systems have arisen for radiotelephones, it has become beneficial to provide portable and mobile radiotelephone stations that are interoperable between these various communication systems. As a first step, dual-mode phones have been developed that can operate between two radiotelephone systems. For example, the Global System for Mobile (GSM) communication and the Wideband Code Division Multiple Access (WCDMA) communication systems are intended to work together in the same mobile terminal equipment operated under a Universal Mobile Telecommunications System (UMTS) environment, wherein a mobile radiotelephone is required to scan for a home Public Land Mobile Network (PLMN) and higher priority PLMNs in these two alternate radio access technologies (RAT) and all possible frequencies within each. In particular, when a UMTS radiotelephone roams and camps on a visited PLMN, the radiotelephone is required to search for its home PLMN and higher priority PLMNs in all possible frequencies of these two radio access technologies. In this way, a single mobile station radiotelephone can automatically determine the availability of its home PLMN, and thus obtain service on its home PLMN if it is available in a given location. In particular, the 3GPP specifications allow for a mobile station to perform (background) scans for PLMNs other than the one on which it has currently obtained service.

Currently, GSM and UMTS cellular phones are required to perform a periodic search for higher priority PLMN, or their home PLMN (HPLMN) whenever the radiotelephone is camped on a Visited PLMN (VPLMN) and in their home country. This search is required to be performed periodically at a rate which is specified on the Subscriber Identity Module (SIM) or Universal SIM card and is a multiple of six minutes (with the fastest rate being once every six minutes). This search consumes battery power to perform because the radiotelephone must measure power on all frequencies of all bands which it supports and then synchronize to each frequency on which there is appreciable energy and read the PLMN identification of the cell. Note that for UMTS radiotelephones which support both GSM and WCDMA Radio Access Technologies (RATs), the radiotelephone is currently required by 3GPP specifications to perform the search in both RATs (i.e. the phone must perform the search for the HPLMN in all radio access technologies of which it is capable). This is true even if the HPLMN network has cells of only one RAT. Therefore, the requirement to search for all possible frequencies in all possible RATs wastes significant battery power.

Currently for the GSM Radio Access Technology (RAT), there is an information element (IE) called Broadcast Control Channel Allocation (BA) Range which may be included in a Channel Release message sent to individual radiotelephones (i.e. on a phone-by-phone basis). This information element contains a non-inclusive list of frequencies in use by the network. Similarly, for WCDMA Radio Access Technology (RAT), there is an information element called Radio PLMN (RPLMN) Information that may be included in a Radio Resource Control (RRC) Connection Release message sent to individual radiotelephones (i.e. on a phone-by-phone basis). This information element also contains a non-inclusive list of frequencies in use by the network. Neither of these information elements are guaranteed by the specifications to be inclusive lists of absolutely all frequencies in use across an operator's entire network within a country. The specifications only allow the radiotelephone to make use of these information elements to speed up the cell selection process by searching on the frequencies specified by these information elements first, before searching on other frequencies. Specifically, the 3GPP 25.331 specification, version 3.12.0 (September 2002) in section 8.1.4.3 states, in regards to the RPLMN information element, that the radiotelephone may ". . . utilise this information, typically indicating where a number of BCCH frequency ranges of a RAT may be expected to be found, during subsequent RPLMN selections of the indicated PLMN." Although useful to speed up scans, the specification does not state that the radiotelephone may search only on these frequencies, nor that these are the only available frequencies.

Therefore, the need exists for a method to allow a mobile unit to obtain an inclusive list of all available frequencies in all available radio access technologies. Moreover, it would be an advantage to scan for only those frequencies that are in use and are supported by the HPLMN and/or higher priority PLMNs. It would also be of benefit to provide this performance improvement with little or no additional cost.

BRIEF DESCRIPTION OF THE DRAWINGS

The features of the present invention, which are believed to be novel, are set forth with particularity in the appended claims. The invention, together with further objects and advantages thereof, may best be understood by making reference to the following description, taken in conjunction with the accompanying drawings, in the several figures of which like reference numerals identify identical elements, and wherein:

DETAILED DESCRIPTION OF THE PREFERRED EMBODIMENT

The present invention provides a method to obtain an inclusive list of all available frequencies in use across an operator's entire network within a country. The present invention also allows a mobile unit to scan for only those available radio access technologies and frequencies that are in use and are supported by its HPLMN and/or higher priority PLMNs and the mobile unit. This saves time and battery power in the mobile unit. Additionally, the present invention can be implemented in a communication system with a relatively simple software modification and no additional hardware, therefore limiting any cost penalty.

Allowing for the possession of an inclusive list of available frequencies to scan for a desired network provides several advantages. These advantages include, but are not limited to, the following examples. The mobile unit can scan for available higher priority service within another PLMN. Scanning can reduce roaming charges when a home network is available. In addition, the higher priority networks may provide more efficient services that can be used beneficially by the mobile unit.

The present invention embodies a method that provides for a radiotelephone to scan for a higher priority public land mobile network (PLMN). For this description, higher priority PLMNs include the home or home equivalent PLMN. In any case, each PLMN includes a plurality of cells for providing radiotelephone service to a radiotelephone within a corresponding geographic area. Each cell includes paging and voice communication and has a radio communication coverage area established by fixed site base stations, which operate to send messages to radiotelephones and receive messages therefrom.

Figure 1:
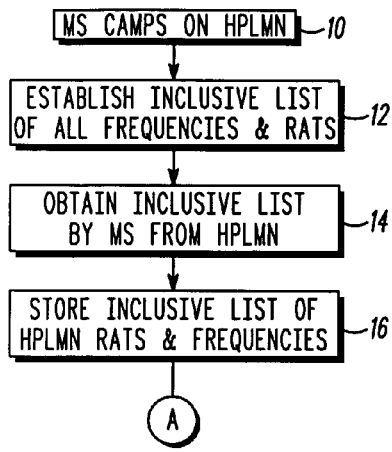
FIG. 1 is a flow chart that illustrates a first embodiment of the present invention.

FIG. 1 shows a mobile radiotelephone operating mode, in accordance with first embodiment of the present invention. In this example, when the mobile station radiotelephone (MS) is switched on, it makes contact with its home Public Land Mobile Network (HPLMN). The MS initiates communication with a base station (BS) of the HPLMN, and the MS registers on the network whereupon the mobile is camped 10 on a base station of the home network (e.g. GSM or WCDMA). A novel aspect of the present invention is having the service provider of the HPLMN establish 12 an inclusive list of all frequencies in all radio access technologies (RATs) in use by the HPLMN. In this way, the MS can obtain 14 an inclusive list of all frequencies in all radio access technologies (RATs) in use across the HPLMN operator's entire network within that country. In particular, this inclusive list includes all the radio access technologies (RATs) which are supported across the entire higher priority PLMN network and a complete list of all frequencies in use (in each RAT) across the entire HPLMN network.

In one embodiment, the inclusive list is provided in an information element for the available RATs. For example, Broadcast Control Channel Allocation (BA) Range IE for the GSM could include the complete list which may be included in a Channel Release message sent to individual radiotelephones (i.e. on a phone-by-phone basis). Similarly, for WCDMA Radio Access Technology (RAT), the RPLMN IE could include the complete list that may be included in a Radio Resource Control (RRC) Connection Release message sent to individual radiotelephones (i.e. on a phone-by-phone basis).

In another embodiment, the inclusive list is broadcast to the camped MS in a message from the base station of the HPLMN. The inclusive list could either be broadcast in the System Information (monitored by all phones) or in a RAN (Radio Access Network) or CN (Core Network) message sent individually to each radiotelephone when it interacts with the network. Optionally, the inclusive list of frequencies and supported RATs can be pre-loaded onto a Subscriber Identity Module (SIM) card provided by the service operator to the user of the MS. The SIM card also includes a list of higher priority PLMNs. If the MS remains on its HPLMN (or home-equivalent PLMN), it is not required to scan for any higher priority PLMNs, as the HPLMN (or home-equivalent PLMN) is considered the highest priority PLMN.

Upon obtaining the inclusive list of frequencies of RATs, the radiotelephone would store 16 the inclusive list either on a Subscriber Identity Module (SIM), Universal SIM (USIM) or in a memory, such as a non-volatile memory, for example. Optionally, the radiotelephone can modify this list to only include those frequencies of RATs that are supported by the radiotelephone. At this point the radiotelephone can proceed with normal communication, which may include roaming (A).

Figure 2:
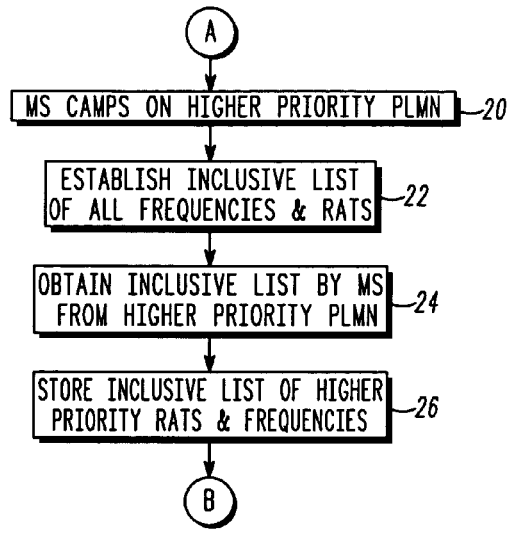
FIG. 2 is a flow chart that illustrates a second embodiment of the present invention.

FIG. 2 shows a mobile radiotelephone operating mode, in accordance with second embodiment of the present invention. In this example, the mobile station radiotelephone (MS) roams to a previously identified (from information by the home PLMN service provider as described above) higher priority Public Land Mobile Network (higher priority PLMN). The MS initiates communication with a base station (BS) of the higher priority PLMN, and the MS registers on the network whereupon the mobile is camped 20 on a base station of the higher priority network. In accordance with the present invention, the service provider of the higher priority PLMN establishes 22 an inclusive list of all frequencies in all radio access technologies (RATs) in use by the higher priority PLMN. In this way, the MS can obtain 24 an inclusive list of all frequencies in all radio access technologies (RATs) in use across the higher priority PLMN operator's entire network within that country. In particular, this inclusive list includes all the radio access technologies (RATs) which are supported across the entire higher priority PLMN network and a complete list of all frequencies in use (in each RAT) across the entire higher priority PLMN network.

As before, the inclusive list can be provided in an information element for the available RATs. For example, Broadcast Control Channel Allocation (BA) Range IE for the GSM could include the complete list which may be included in a Channel Release message sent to individual radiotelephones (i.e. on a phone-by-phone basis). Similarly, for WCDMA Radio Access Technology (RAT), the RPLMN IE could include the complete list that may be included in a Radio Resource Control (RRC) Connection Release message sent to individual radiotelephones (i.e. on a phone-by-phone basis).

Alternatively, the inclusive list can be broadcast to the camped MS in a message from the base station of the higher priority PLMN. The inclusive list could either be broadcast in the System Information (monitored by all phones) or in a RAN (Radio Access Network) or CN (Core Network) message sent individually to each radiotelephone when it interacts with the network. Once on the higher priority PLMN, the MS is required to scan for the HPLMN (or home-equivalent PLMN).

Upon obtaining the inclusive list of frequencies of RATs, the radiotelephone would store 26 the inclusive list either on a Subscriber Identity Module (SIM), Universal SIM (USIM) or in a memory, such as a non-volatile memory, for example, along with the inclusive list of frequencies and RATs that it previously stored for the HPLMN. Optionally, the radiotelephone can modify the list(s) to only include those frequencies of RATs that are supported by the radiotelephone. At this point the radiotelephone can proceed with normal communication, which may include roaming (B).

Figure 3:
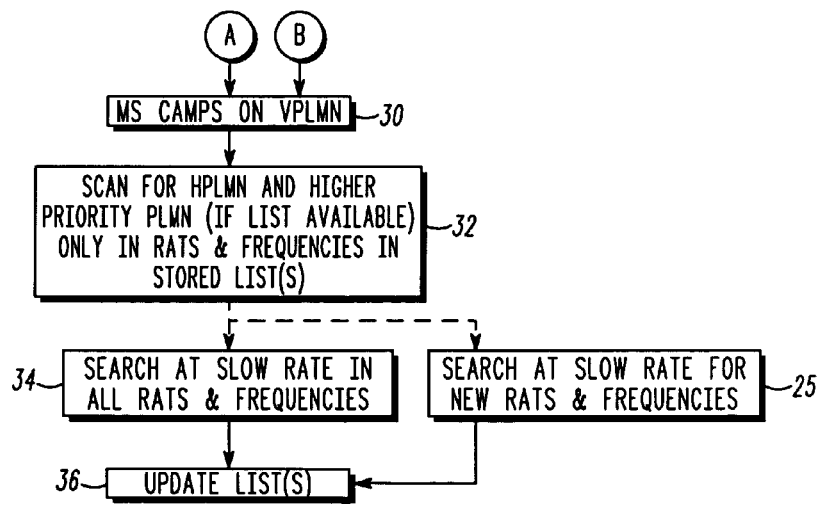
FIG. 3 is a flow chart that illustrates a further embodiment of either FIG. 1 and/or FIG. 2, in accordance with the present invention.

Referring to FIG. 3, in the case where the MS is roaming, it may register and camp 30 on a base station of a Visited PLMN (VPLMN), in accordance with a further embodiment of the present invention. This can occur when the MS roams from its HPLMN (A) to previously camped higher priority PLMN or to a lower priority PLMN. This can also occur when the MS roams from a previously camped higher priority PLMN (B) to a lower priority PLMN. The VPLMN can consist of one or more different radio access technologies, such as GSM and WCDMA, for example. Typically, when turned on the radiotelephone camps on the last registered PLMN. If the last registered PLMN is a VPLMN, then other higher priority PLMNs may be available. Therefore, several other higher priority networks can be available to the MS. The priority of available networks is determined through the predetermined priority provided on the mobile unit's Subscriber Identity Module (SIM) card. In the roaming case, the mobile station is required under the 3GPP standard to do a search periodically to find access to higher priority networks, and preferably its home PLMN. Specifically, the 3GPP 23.122 specification, version 5.2.0 (2002-12) in section 4.4.3.3 states, "If the MS is in a VPLMN, the MS shall periodically attempt to obtain service on its HPLMN or higher priority PLMN . . . " The present invention finds particular effect in those cases where the mobile station is not camped on the HPLMN of the mobile unit, inasmuch as the HPLMN is the highest priority, and no search is then required.

When camped on a lower priority VPLMN and the only higher priority PLMN is the HPLMN, the present invention provides that the radiotelephone scan 32 only in those RATs and frequencies indicated by the stored inclusive list obtained earlier from the HPLMN. In as much as scanning involves synchronizing to and reading PLMN IDs of many base stations, the use of the list saves the time and battery drain of searching in absolutely all possible RATs and frequencies that could exist. If the home (or home equivalent) PLMN is found, then the MS can reselect to it. Similarly, when camped on a lower priority VPLMN and the MS has lists of RATs and frequencies of higher priority PLMNs and the HPLMN, the present invention provides that the radiotelephone scan 32 those RATs and frequencies indicated by both stored inclusive lists obtained earlier from the HPLMN and higher priority PLMN. Of course, the MS may have lists from more than one higher priority PLMN. In as much as scanning involves synchronizing to and reading PLMN IDs of many base stations, the use of the list(s) saves the time and battery drain of searching in absolutely all possible RATs and frequencies that could exist. If the home, home equivalent, or higher priority PLMN is found, then the MS can reselect to it.

It may be the case that the higher priority PLMN or HPLMN operator, after the radiotelephone has obtained the inclusive list(s) of RATs and frequencies, adds more frequencies to their network, but did not have a chance to broadcast this information to that particular radiotelephone again before such time as that radiotelephone becomes camped on a lower priority VPLMN and needs to search for the HPLMN (and higher priority PLMN, if applicable). In this case, the stored list(s) for the radiotelephone needs to be updated, and the present invention provides that when camped on a VPLMN, the radiotelephone will periodically perform the HPLMN (and higher priority PLMN, if applicable) search 34 in all RATs and frequencies of which it is capable, but at a very slow rate so as not to use up much battery current. This slow rate can be any rate that is slower than the normal scanning rate of the MS. If any new frequencies are found, the MS can update 36 the stored inclusive list(s) with any new information found in the searching step. By only performing the search in the RATs which are currently employed by the home PLMN operator (and higher priority PLMN operator, if applicable) and on the frequencies which are currently employed by the HPLMN operator (and higher priority PLMN, if applicable), the battery drain is greatly reduced. Alternatively, the radiotelephone could perform the HPLMN search (and higher priority PLMN search, if applicable), at a very slow rate so as not to use much battery power, in only those RATs and frequencies 25 which it does not already have stored (i.e. new frequencies), and then update 26 the stored list(s) with only that new information found.

In order to properly use the invention, it must be guaranteed that the list(s) of available RATs and frequencies is complete. The complete list(s) is supplied by the particular service operator to the MS. For example, the RPLMN Information Element (IE) and the BA Range IE could include an inclusive list of absolutely all frequencies within each RAT in use across an operator's entire network within a country, or a new IE could be added to either: a System Information message (monitored by all phones), a RAN (Radio Access Network) message transmitted to individual phones, or a CN (Core Network) message transmitted to individual phones. This new IE would then be guaranteed to be an inclusive list of absolutely all frequencies within each RAT in use across an operator's entire network within a country.

A preferred embodiment of the present invention provides a method for a radiotelephone to scan for a higher priority public land mobile network (PLMN). In this case, a higher priority PLMN can include a home or home equivalent PLMN, in addition to higher priority networks identified by the HPLMN service provider. In each case, a PLMN includes a plurality of cells for providing radiotelephone service to a radiotelephone within a corresponding geographic area. Each cell includes paging and voice communication and has a radio communication coverage area established by fixed site base stations, which operate to send messages to radiotelephones and receive messages therefrom. One step of the method includes establishing an inclusive list of all frequencies in all radio access technologies (RATs) in use and available in each higher priority PLMN upon which the MS has camped. Each list is determined by each network operator since the network operator is the one providing this service. The information is an inclusive list of all frequencies in use in each available radio access technology across the entire public land mobile operator network in that country.

In a next step, the mobile radiotelephone registers and camps on a previously identified higher priority PLMN (that could include a home or home equivalent PLMN) that has service in one or more radio access technologies in which the radiotelephone is capable. A novel aspect of the present invention is having the higher priority PLMN broadcast the inclusive list of frequencies from the establishing step so that the camped radiotelephone can obtain the list. The information can be broadcast in system information monitored by all radiotelephones, or it can be broadcast individually to each radiotelephone when it interacts with the home public land mobile network. Since this information is an inclusive list of all frequencies and radio access technologies in use by the higher priority PLMN, it is no longer necessary for the mobile unit to waste power scanning for all possible radio access technologies and all possible frequencies in use across the country. Once the radiotelephone obtains this inclusive list of frequencies, it then stores the list in a next step, either on a SIM card or in internal memory.

In a next step, it may be that the radiotelephone roams and finds itself camped on a lower priority Visited PLMN. In this case, the radiotelephone is required to begin scanning for the HPLMN (and higher priority PLMNS, if applicable). In accordance with the present invention, the radiotelephone will scan for the HPLMN (and higher priority PLMNS, if applicable) using only those frequencies of the stored inclusive list(s). In particular, the radiotelephone can scan for only those radio access technologies and only those listed frequencies that are in the stored information. Moreover, the radiotelephone can modify the stored information to use only those technologies and frequencies upon which it is operable. For example, if a radiotelephone is only operable on WCDMA, and the home network has GSM and WCDMA operability, then the radiotelephone can ignore the GSM radio access technology information and associated frequencies.

In the preferred embodiment, the method includes further steps of periodically searching (but at a very slow rate so as not to use much battery power) for any new information about new frequencies in use in the radio access technologies of the public land mobile network(s), and updating the stored information with any new information found in the searching step. The search can entail searching in all possible RATs and frequencies, or optionally searching only in the RATs and frequencies that are not already present in its previously stored inclusive list(s). This searching is desired for those cases where a service operator changes or adds to its frequencies after broadcasting its original list of frequencies to the radiotelephone. This is a failsafe technique to ensure that the radiotelephone keeps up to date information in accordance with the requirements of the 3GPP standard. This updating feature would only be in effect until the next time that the radiotelephone receives a new inclusive list of all RATs and frequencies from the network.

The present invention provides particular advantage for service providers that are looking forward to the availability of mobile stations capable of selecting the highest priority network. These features will provide a way for operators to use these same mobile stations while minimizing the impact on their networks.

In addition, it should be recognized that the method of the present invention can also be applied to scanning for more than one radio access technology, using a multimode radiotelephone capable of camping on several different radio technology systems.

While the invention has been described in the context of several embodiments, it will be apparent to those skilled in the art that the present invention may be modified in numerous ways and may assume many embodiments other than that specifically set out and described above. Accordingly, it is intended by the appended claims to cover all modifications of the invention which fall within the broad scope of the invention.

What is claimed is:

1. A method for a radiotelephone to scan for a higher priority public land mobile network (PLMN), each PLMN having a plurality of cells for providing radiotelephone service to a radiotelephone within a corresponding geographic area, each cell having a radio communication coverage area established by fixed site base stations, and each base station operable to send messages to radiotelephones, the method comprising the steps of:
 camping on the higher priority PLMN;
 establishing an inclusive list of all frequencies in use by the higher priority PLMN in all radio access technologies (RATs);
 obtaining the inclusive list by the radiotelephone;
 storing the inclusive list;
 camping on a visited PLMN;
 scanning for the higher priority PLMN using only those frequencies of the stored inclusive list.

2. The method of claim 1, wherein the obtaining step includes;
 broadcasting the inclusive list of frequencies from the establishing step to the radiotelephone by the higher priority PLMN.

3. The method of claim 2, wherein the frequency information in the broadcasting step is broadcast in system information monitored by all radiotelephones.

4. The method of claim 2, wherein the information in the broadcasting step is broadcast individually to each radiotelephone when it interacts with the higher priority PLMN.

5. The method of claim 1, wherein the PLMN is a home PLMN of the radiotelephone and the obtaining step includes;
 providing the inclusive list from the establishing step to the radiotelephone preloaded on a subscriber identity module.

6. The method of claim 1, further comprising the steps of:
 searching at a slower than normal scanning rate for any newly available frequencies in each RAT of the higher priority PLMN; and
 updating the stored list with any new frequencies found in the searching step.

7. A method for a radiotelephone to scan for a higher priority public land mobile network (PLMN), each PLMN having a plurality of cells for providing radiotelephone service to a radiotelephone within a corresponding geographic area, each cell having a radio communication coverage area established by fixed site base stations, and each base station operable to send messages to radiotelephones, the method comprising the steps of:
 establishing an inclusive list of all frequencies in use by the higher priority PLMN in all radio access technologies (RATs) in the higher priority PLMN across a country;
 camping the radiotelephone on the higher priority PLMN;
 broadcasting the inclusive list from the establishing step to the camped radiotelephone by the higher priority PLMN;
 storing the inclusive list;
 roaming to a visited PLMN having a lower priority than the higher priority PLMN; and
 scanning for the higher priority PLMN in only those RATs and frequencies indicated by the stored inclusive list.

8. The method of claim 7, further comprising the steps of:
 periodically searching at a slower than normal scanning rate for all available frequencies in each RAT across the higher priority PLMN; and
 updating the stored list with any new frequencies found in the searching step.

9. The method of claim 7, further comprising the steps of:
 periodically searching at a slower than normal scanning rate for any new frequencies in use that have not previously been stored in the storing step; and
 updating the stored information with any new frequencies found in the searching step.

10. The method of claim 7, wherein the information in the broadcasting step is broadcast in system information monitored by all radiotelephones.

11. The method of claim 7, wherein the information in the broadcasting step is broadcast individually to each radiotelephone when it interacts with the higher priority PLMN.

12. The method of claim 7, wherein the storing step includes storing the information in one or more of a nonvolatile memory of the radio telephone and a subscriber identity module associated with the radiotelephone.

13. A method for a radiotelephone to scan for a higher priority public land mobile network (PLMN), each PLMN having a plurality of cells for providing radiotelephone service to a radiotelephone within a corresponding geographic area, each cell having a radio communication coverage area established by fixed site base stations, and each base station operable to send messages to radiotelephones, the method comprising the steps of:

establishing an inclusive list of all frequencies in use in all radio access technologies (RATs) in a home PLMN across a country;

camping the radiotelephone on the home PLMN (HPLMN);

broadcasting the inclusive list from the establishing step to the radiotelephone by the HPLMN;

storing the inclusive list;

roaming to a visited PLMN having a lower priority than the HPLMN; and scanning for a higher priority PLMN in only those RATs and frequencies indicated by the stored inclusive list.

14. The method of claim 13, further comprising the steps of:

identifying higher priority PLMNs to the radiotelephone by the HPLMN;

establishing an inclusive list of all frequencies in use by the higher priority PLMN in all radio access technologies (RATs);

camping the radiotelephone on a higher priority PLMN;

obtaining the inclusive list from the higher priority PLMN by the radiotelephone; and storing the inclusive list along with the inclusive list from the PLMN.

15. The method of claim 13, farther comprising the steps of:

periodically searching at a slower than normal scanning rate for all available frequencies in each RAT across the network; and updating the list with any new frequencies found in the searching step.

16. The method of claim 13, further comprising the steps of:

periodically searching at a slower than normal scanning rate for any new frequencies in use that are not in the inclusive list of the broadcasting step; and updating the inclusive list with any new frequencies found in the searching step.

17. The method of claim 13, wherein the information in the broadcasting step is broadcast in at least one of the group of: system information monitored by all radiotelephones, a radio access network message sent individually to each radiotelephone, and a core network message sent individually to each radiotelephone.

18. The method of claim 13, further comprising the step of storing the inclusive list in one or more of a non-volatile memory of the radio telephone and a subscriber identity module associated with the radiotelephone.

\* \* \* \* \*